United States Patent [19]

Haberthur-Heilig

[11] 4,274,126

[45] Jun. 16, 1981

[54] HOUSING FOR FLASH APPARATUS WITH AT LEAST ONE FLASH BULB SOCKET

[75] Inventor: Walter Haberthur-Heilig, Hofstetten/SO, Switzerland

[73] Assignee: Bron Elektronik AG, Allschwil bei Basel, Switzerland

[21] Appl. No.: 971,534

[22] Filed: Dec. 20, 1978

[30] Foreign Application Priority Data

Dec. 22, 1977 [DE] Fed. Rep. of Germany ... 7739045[U]

[51] Int. Cl.[3] .............................................. H02B 1/08

[52] U.S. Cl. ................................ 361/334; 200/61.85; 307/150; 307/157; 339/111

[58] Field of Search .................. 362/95, 3, 9, 10, 183; 307/150, 157; 354/126, 145; 339/39, 36, 111; 361/331, 332, 334; 315/241 P; 200/61.85

[56] References Cited

U.S. PATENT DOCUMENTS

| | | | |
|---|---|---|---|
| 1,950,200 | 3/1934 | Tritle | 339/39 |
| 3,809,968 | 5/1974 | Haberthur | 307/150 X |

*Primary Examiner*—John Gonzales

*Attorney, Agent, or Firm*—Becker & Becker, Inc.

[57] ABSTRACT

A housing for a flash apparatus with at least one socket arranged on the housing of the apparatus for connection with flash tubes, which includes a condenser provided in the housing. On the housing there is arranged an adjustable locking device which includes at least one adjustable latching member for locking or blocking the socket for the flash tube, and also includes at least one control element which is adjustable together with the latching member. In the path of movement of the adjustable control element there is arranged a control pin of a network switch which is preferably a microswitch.

6 Claims, 2 Drawing Figures

HOUSING FOR FLASH APPARATUS WITH AT LEAST ONE FLASH BULB SOCKET

The present invention relates to a housing for a flash bulb device having at least one socket arranged on the housing thereof, for connection with flash bulbs and including a condenser arranged within said housing.

The condenser of such flash bulb devices has a relatively high capacity and is intended to store electrical energy of a high voltage. This energy is discharged according to necessity, by an ignition pulse in a flash bulb connected to the condenser through a pertaining plug which is inserted into the socket provided on the housing. Frequently, the flash bulbs are provided in a separate flash lamp which is arranged separate from the flash bulb device.

With flash bulb devices of this type, difficulties can occur when the provided plug connections are used as operating elements for instance for connection with or disconnection from other flash bulbs, lamps or other devices. If with such plug manipulations, no consideration is given to the condition of the storage device electrically there may occur that from a connected device, for instance by an infrared emitter or the like, interfering pulses are generated which initiate an ignition pulse precisely when the plug connection to the flash bulb is disconnected or is established. As a result thereof, the discharge current of the condenser flows over the moved plug contacts and generates a light arc which may be so strong that the contact pairs of the plug connection become welded to each other. In a similar manner, drawbacks may occur if the plug connection is only poorly effected, or such drawbacks may occur when the flash device prior to the establishment or the separation of the plug connection has not been switched off.

It is therefore an object of the present invention so to design a flash apparatus of the above mentioned general type that the plug connections will be protected against faulty operation so that an improved safety of operation of the apparatus will be realized.

These and other objects and advantages of the invention will appear more clearly from the following specification in connection with the accompanying drawings, in which.

The accessory for a flash device according to the invention is characterized primarily in that on the housing there is arranged an adjustable blocking or locking device which has at least one adjustable locking or blocking member for blocking the socket and has at least one adjustable control member which is adjustable together with the locking member, while in the path of movement of the adjustable control member there is arranged the control pin of a network switch preferably designed as microswitch. The flash device is kept in readiness for operation only when the locking device by means of its locking member prevents the plug, which has been properly introduced into the socket, from accidentally being pulled out. Therefore, only in the locking position, a desirable current of the condenser can pass through the flash tube. Before the plug can be pulled out of the socket, the locking member must be moved out of its locking position whereby the control member due to its rigid connection with the locking parts releases the control pin of the microswitch. In this way the network voltage is switched off so that the energy supply to the ignition circuit is interrupted. Conversely, the plug cannot be plugged into the socket when the flash device is turned on. This is due to the fact that also the plug-in or insertion of the plug is possible only in the unlocked condition of the locking device. The ignition circuit is therefore always interrupted when establishing and when disconnecting the plug connection so that no light arc can form between the plug and the socket, and a contact burning will be safely prevented. A welding of the contact pairs to each other is likewise impossible.

It is particularly advantageous when the locking device, according to a further development of the invention is designed as handle which is pivotally mounted in the housing at the end sections of its two legs while the end section of at least one of the two legs, with regard to the pivot and mounting axis is radial and is arranged as a contact cam in circumferential direction.

Figure 1:
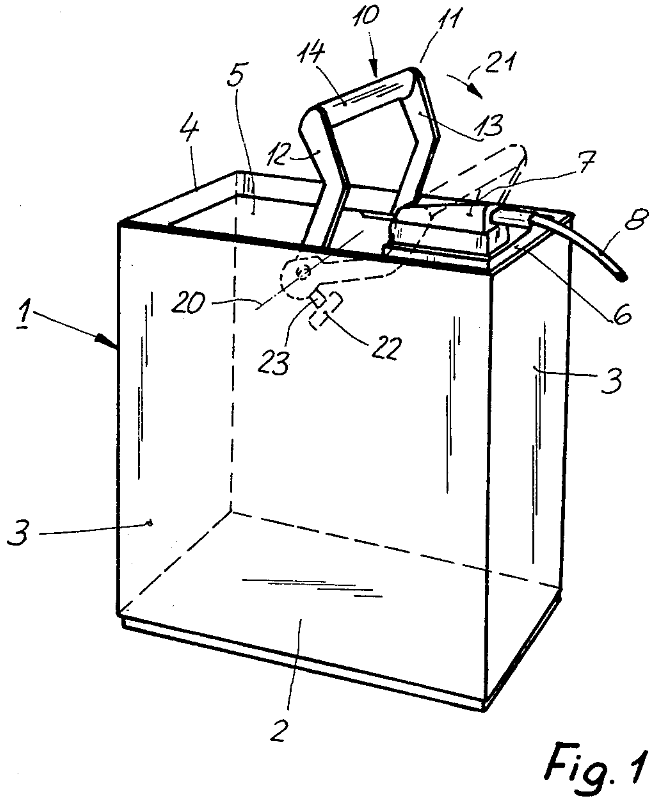
FIG. 1 is an isometric view of the flash device according to the invention.
Figure 2:
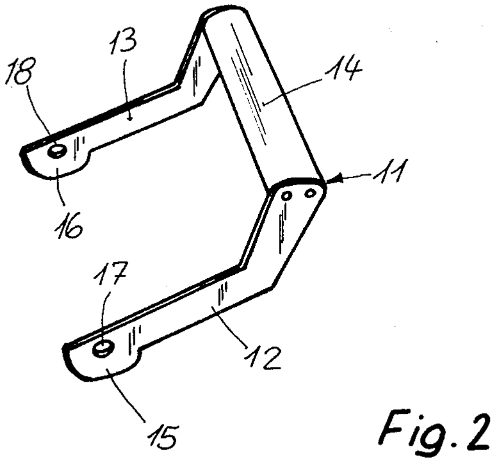
FIG. 2 is an isometric view of a locking device designed as carrying handle, for a flash device.

Referring now to the drawings in detail, the flash device illustrated in FIG. 1 has a housing 1 with a rectangular base surface 2 which is connected to side walls 3 vertically arranged on said surface 2. Provided on the top side of the housing is a cover plate 5 which is offset in downward direction relative to the upper edges 4 of the side walls 3. A plurality of sockets 6 are arranged adjacent to each other on said cover plate 5. One lamp or bulb plug 7 each can be inserted from above into said sockets. Each of said lamp plugs 7 is connected by way of a lamp cable 8 to a non-illustrated flash bulb and serves for connecting a storage condenser (not shown in FIG. 1) with a flash tube or illuminator pertaining to a flash lamp or bulb.

Electrical energy of relatively high voltage is stored in the non-illustrated condenser which is discharged by means of an ignition pulse through the respectively connected flash tubes.

Provided on the flash bulb device is a locking device 10 in order to prevent the above mentioned danger that during a discharging operation, one of the plugs 7 is pulled out of its socket 6 whereby a light arc between the plug and the socket would be formed which could cause a burning off or welding together of the contacts to be separated.

This locking device according to the specific embodiment shown comprises a two-leg handle 11 which comprises two angled-off legs 12 and 13 arranged in parallel, and also comprises a yoke serving as handle part 14. This yoke forms a locking member and is respectively connected to one of the two free end sections of legs or arms 12 and 13.

At the other end section, each of the legs 12 and 13 is widened to form an approximately semi-circular control cam 15, 16 which serves as control member. Each of the control cams comprises a central bore 17, 18 for respectively receiving bearing bolts (not shown in the drawing) which form a common bearing axle 20 for the yoke 11. The yoke 11 may be pivoted from its position shown in solid lines in FIG. 1, in the direction of the arrow 21 into the region above the bushings or sockets 6. In this position illustrated in FIG. 1 in dot-dash lines, the handle member 14 is closely above the plugs 7 in the bushings or sockets which therefore can be released from their plug connection only when the yoke 11 is pivoted back about a pivot angle worth mentioning.

Within the pivot path of at least one of the two control cams 15, 16 there is provided the control pin 23 of a microswitch 22 arranged in the vicinity of the bearing axle 20. The microswitch 22 is directed by way of the control pin 23 radially against the circumferential direction of the control cam held in its closing position when the yoke 11 occupies its dash-line closing position. Through the two non-illustrated control conduits of the microswitch 22, the feeding or supply line may pass network voltage necessary for generating an ignition pulse. By means of this locking device, it will be assured that a discharge current from the storage condenser can flow always only to the connected flash tube when and as long as the locking yoke 11 is located in the locking position indicated in dash lines in FIG. 1. If, however, the locking yoke 11 is pivoted back from its FIG. 1 locking position, for instance in order to be able to pull the plug 7 from the socket 6, the microswitch 22 moves into its turned-off position. As a result thereof, the network voltage is switched off and thus also the ignition circuit is interrupted. Consequently, no discharge current can flow from the condenser so that the plug connection during the closing and breaking will always be currentless, and no light arc can form which could weld the plug pins to the plug bushing or socket.

When no plugs 7 are plugged into the sockets 6, the yoke 11 for transporting the flash device in a space-saving manner can be lowered below the upper edge 4 of the housing so that the yoke 11 will rest on the empty socket 6 and will form a protection for said connecting elements against electrical shock or accidental contact of said connecting elements. If the yoke 11 is pivoted into the position shown in FIG. 1 indicated by solid lines, the yoke will contact a non-illustrated abutment and then in this position can serve for carrying the flash device. Inasmuch as the illustrated microswitch 22 with the yoke pivoted upwardly occupies its open position, a further contact bar of this switch or a similar second microswitch arranged in the vicinity of the control cam 16 can be utilized by pivoting the yoke up to its abutment, to turn off the net voltage from the charging circuit of the storage condenser. By means of the microswitch, also additionally to the ignition circuit or alternately thereto the discharge circuit of the condenser can be interrupted.

For a high mechanical stability and capability of resistance of supporting yoke 11 it may be expedient to make all its parts, in other words the two legs 12 and 13 as well as the handle section 14, of metal. In such an instance, the handle member 14 may be provided with a cover of insulating material. However, it is also possible to produce the entire supporting yoke 11 including the handle piece 14 of synthetic material while advantageously the legs 12 and 13 may form a single piece with the handle section 14.

According to a particularly advantageous embodiment, the supporting yoke may in its pivotal range be under the influence of a preloaded spring which has the tendency to hold the handle section 14 of the supporting yoke against the plugs 7, and if the latter have been removed from the socket 16, being held against the sockets under tension. This is particularly favorable during the transporting of the flash device because in such an instance the supporting yoke 11, as mentioned above, is lowered below the upper rim 4 of the housing and will thus protect the plugs against damage.

It is, of course, to be understood that the present invention is, by no means, limited to the specific showing in the drawings, but also comprises any modifications within the scope of the appended claims.

What I claim is:

1. An accessory combination for a flash apparatus which includes: a housing that receives a condenser arranged therein with at least one socket having a plug-in opening and arranged on said housing for connection with flash tubes, an adjustable blocking device provided on said housing and including at least one adjustable blocking member movable into a blocking position for blocking said socket, and also including at least one movable control member adjustable together with said blocking member, and a network switch having a control pin arranged within the path of movement of said at least one movable control member, said blocking member and said control member assuring against unintended flashing and arcing in said socket, said network switch being a microswitch, said at least one movable control member comprising arm means pivotally mounted on said housing and having one end from which said blocking member projects at an angle of at least nearly 90°, said blocking member when in its blocking position being located above the plug-in opening of said socket covered thereby, said blocking member forming a U-shaped handle, said at least one movable control member simultaneously forming a control cam for said microswitch, said at least one movable control member of said blocking device being pivotable about an axis, and said at least one movable control member with regard to said axis in radial and circumferential direction being a cam disc, said adjustable blocking device comprising a yoke with two parallel arms having their free end sections pivotally supported by two oppositely located wall sections of said housing.

2. An apparatus in combination according to claim 1, in which said at least one adjustable blocking member is made at least partially of a metallic material, and in which said at least one blocking member is provided with a coat of insulating material.

3. An apparatus in combination according to claim 1, in which said at least one adjustable blocking member is made at least partially of synthetic material.

4. An apparatus in combination according to claim 1, in which said at least one movable control member forms one piece with said at least one adjustable blocking member.

5. An apparatus in combination according to claim 4, which includes spring means associated with said adjustable blocking device for continuously urging the same into its blocking position.

6. An apparatus in combination according to claim 5, in which said control pin is directed toward the circumferential surface of said at least one control member.

* * * * *